United States Patent
Seki et al.

(10) Patent No.: US 8,852,428 B2
(45) Date of Patent: Oct. 7, 2014

(54) HYDROREFINING METHOD

(75) Inventors: Hiroyuki Seki, Yokohama (JP);
Masahiro Higashi, Yokohama (JP)

(73) Assignee: Nippon Oil Corporation, Tokyo (JP)

( * ) Notice: Subject to any disclaimer, the term of this patent is extended or adjusted under 35 U.S.C. 154(b) by 554 days.

(21) Appl. No.: 12/096,221

(22) PCT Filed: Dec. 7, 2006

(86) PCT No.: PCT/JP2006/324450
§ 371 (c)(1),
(2), (4) Date: Jun. 5, 2008

(87) PCT Pub. No.: WO2007/066721
PCT Pub. Date: Jun. 14, 2007

(65) Prior Publication Data
US 2009/0166265 A1    Jul. 2, 2009

(30) Foreign Application Priority Data
Dec. 9, 2005   (JP) .................. 2005-356552

(51) Int. Cl.
| C10G 45/12 | (2006.01) |
|---|---|
| C10G 45/64 | (2006.01) |
| C10G 45/06 | (2006.01) |
| B01J 21/06 | (2006.01) |
| B01J 21/12 | (2006.01) |
| B01J 37/00 | (2006.01) |
| B01J 29/14 | (2006.01) |
| B01J 21/14 | (2006.01) |
| C10G 45/62 | (2006.01) |
| B01J 29/12 | (2006.01) |
| C10G 45/10 | (2006.01) |
| B01J 21/02 | (2006.01) |
| B01J 35/02 | (2006.01) |

(52) U.S. Cl.
CPC ................ *C10G 45/12* (2013.01); *C10G 45/06* (2013.01); *B01J 21/066* (2013.01); *B01J 21/12* (2013.01); *B01J 37/0009* (2013.01); *B01J 29/146* (2013.01); *B01J 21/06* (2013.01); *C10G 2300/202* (2013.01); *B01J 21/14* (2013.01); *C10G 2300/1022* (2013.01); *C10G 45/62* (2013.01); *B01J 29/126* (2013.01); *C10G 2400/02* (2013.01); *B01J 2229/20* (2013.01); *B01J 2229/42* (2013.01); *B01J 35/023* (2013.01); *C10G 2300/4018* (2013.01); *C10G 45/10* (2013.01); *B01J 21/02* (2013.01); *C10G 45/64* (2013.01)
USPC ........... 208/295; 208/135; 208/136; 208/137; 208/141; 208/264; 208/297; 208/299

(58) Field of Classification Search
USPC ......... 208/264, 295, 297, 299, 111.01, 111.3, 208/111.35, 133–138, 141
See application file for complete search history.

(56) References Cited

U.S. PATENT DOCUMENTS

| 4,046,829 | A |  | 9/1977 | Ireland et al. |
|---|---|---|---|---|
| 4,234,412 | A |  | 11/1980 | Boersma et al. |
| 5,362,378 | A |  | 11/1994 | Borghard et al. |
| 5,378,348 | A |  | 1/1995 | Davis et al. |
| 5,690,810 | A | * | 11/1997 | Lawrence et al. .............. 208/135 |
| 6,136,291 | A | * | 10/2000 | Chester et al. ................ 423/713 |
| 6,531,515 | B2 | * | 3/2003 | Moore et al. .................. 518/700 |
| 6,902,664 | B2 | * | 6/2005 | Timken .................... 208/111.01 |
| 2002/0173556 | A1 | * | 11/2002 | Moore et al. .................. 518/726 |
| 2003/0119924 | A1 | * | 6/2003 | Moore et al. .................. 518/728 |
| 2003/0168379 | A1 | * | 9/2003 | Degnan et al. ................. 208/27 |
| 2004/0092384 | A1 |  | 5/2004 | Timken et al. |
| 2006/0006098 | A1 | * | 1/2006 | Espinoza et al. ............... 208/15 |
| 2007/0029228 | A1 | * | 2/2007 | Aoki et al. .................... 208/113 |

FOREIGN PATENT DOCUMENTS

| JP | 54-153803 | 12/1979 |  |  |
|---|---|---|---|---|
| JP | 2005-320379 | 11/2005 |  |  |
| WO | WO 01/57160 | 8/2001 |  |  |
| WO | WO 2004/044100 | 5/2004 |  |  |
| WO | WO 2005/092500 | * | 10/2005 | ............... B01J 29/12 |

OTHER PUBLICATIONS

Japanese Official Action dated Jul. 12, 2011.

* cited by examiner

*Primary Examiner* — Renee E Robinson
(74) *Attorney, Agent, or Firm* — Finnegan, Henderson, Farabow, Garrett & Dunner, LLP

(57) ABSTRACT

The hydrorefining method of the invention is characterized by contacting, in the presence of hydrogen, a fuel stock comprising normal paraffins and oxygen-containing compounds, with a hydrorefining catalyst comprising a support containing USY zeolite and at least one solid acid selected from among silica-alumina, alumina-boria, silica-zirconia, silica-magnesia and silica-titania, and at least one metal selected from among metals of Group VIb and metals of Group VIII of the Periodic Table supported on the support.

5 Claims, No Drawings

HYDROREFINING METHOD

CROSS-REFERENCE TO RELATED APPLICATIONS

This application is a national phase application of International Application No. PCT/JP2006/324450, filed Dec. 7, 2006, and claims the priority of Japanese Application No. 2005-356552, filed Dec. 9, 2005, the content of both of which is incorporated herein by reference.

TECHNICAL FIELD

The present invention relates to a hydrorefining method whereby a fuel stock and a hydrorefining catalyst are contacted in the presence of hydrogen.

BACKGROUND ART

Demand for environmentally-friendly, clean liquid fuels with low sulfur and aromatic hydrocarbon contents has increased in recent years from the viewpoint of reducing environmental load. Fischer-Tropsch synthesis (hereinafter referred to as "FT synthesis") using carbon monoxide and hydrogen as feedstock has been studied in the petroleum industry as a process for production of clean fuels. FT synthesis is a highly promising method as it allows production of liquid fuel stocks rich in paraffins and containing no sulfur.

Because of their high normal paraffin contents, however, fuel stocks obtained by FT synthesis cannot easily be used directly as fuels. More specifically, such fuel stocks have insufficient octane numbers for use as gasoline for automobiles, while their cold flow properties are insufficient for use as gas oils.

Hydrorefining techniques, whereby normal paraffins in fuel stocks are converted to isoparaffins, have been investigated with the goal of increasing the octane numbers and improving the cold flow properties of fuel stocks obtained by FT synthesis. Known catalysts for use in such hydrorefining techniques include catalysts comprising palladium supported on silica-alumina (see Patent document 1, for example) and catalysts comprising cobalt and molybdenum supported on silica-alumina (see Patent document 2, for example).

[Patent document 1] U.S. Pat. No. 5,378,348
[Patent document 2] International Patent Publication No. WO01/057160

DISCLOSURE OF THE INVENTION

Problems to be Solved by the Invention

Incidentally, combustion stock yields are lower when hydrorefining is accompanied by lightening of fuel stocks. It is therefore preferred for hydrorefining to accomplish the conversion of normal paraffins to isoparaffins with minimal decomposition. The fuel stocks obtained by FT synthesis normally contain oxygen-containing compounds such as alcohols. Since such oxygen-containing compounds can result in reduced oxidation stability of the fuel stock, it is preferred to minimize the amount of oxygen-containing compounds in the fuel stock by their removal or conversion to other substances.

However, despite many years of research and development on the aforementioned catalysts, no technology has yet been devised for simultaneously achieving isomerization of normal paraffins and reduction of oxygen-containing compounds while maintaining fuel stock yields.

It is therefore an object of the present invention to provide a hydrorefining method that allows isomerization of normal paraffins in fuel stocks and reduction of oxygen-containing compounds in fuel stocks to be achieved simultaneously while sufficiently maintaining fuel stock yields.

Means for Solving the Problems

In order to solve the problems described above, the hydrorefining method of the invention is characterized by contacting, in the presence of hydrogen, a fuel stock comprising normal paraffins and oxygen-containing compounds, with a hydrorefining catalyst comprising a support containing USY zeolite and at least one solid acid selected from among silica-alumina, alumina-boria, silica-zirconia, silica-magnesia and silica-titania, and at least one metal selected from among metals of Group VIb and metals of Group VIII of the Periodic Table supported on the support.

In the hydrorefining method of the invention, a hydrorefining catalyst comprising a specific metal supported on a support which is a combination of USY zeolite and a specific solid acid is used as the hydrorefining catalyst, to allow effective conversion of the oxygen-containing compounds such as alcohols in the fuel stock to paraffins, as well as effective conversion (isomerization) of the normal paraffins derived from the oxygen-containing compounds and the normal paraffins originally present in the fuel stock, and to sufficiently inhibit lightening of the fuel stock that occurs with conversion of the oxygen-containing compounds to paraffins and isomerization to normal paraffins. According to the hydrorefining method of the invention, it is possible for isomerization of normal paraffins in fuel stocks and reduction of oxygen-containing compounds in fuel stocks to be achieved simultaneously while sufficiently maintaining fuel stock yields.

The mean particle diameter of the USY zeolite in the hydrorefining catalyst used for the hydrorefining method of the invention is preferably 1.0 μm or smaller. Using USY zeolite with a mean particle diameter of 1.0 μm or smaller can sufficiently prevent lightening of the fuel stock.

The molar ratio of silica/alumina in the USY zeolite is preferably 10-200. A silica/alumina molar ratio of 10-200 can achieve a high level for both lightening of the fuel stock and improvement in the catalytic activity.

The hydrorefining catalyst used in the hydrorefining method of the invention preferably contains at least one metal selected from among nickel, palladium and platinum as metals supported on the support.

The reaction temperature for contact between the fuel stock and hydrorefining catalyst in the hydrorefining method of the invention is preferably 160° C.-350° C., and the liquid hourly space velocity (LHSV) is preferably 0.1-5.0 h$^{-1}$.

Effect of the Invention

As mentioned above, the hydrorefining method of the invention allows isomerization of normal paraffins in fuel stocks and removal of oxygen-containing compounds from fuel stocks to be achieved simultaneously while sufficiently maintaining fuel stock yields.

BEST MODE FOR CARRYING OUT THE INVENTION

Preferred embodiments of the invention will now be described in detail.

The hydrorefining method of the invention is characterized by contacting, in the presence of hydrogen, a fuel stock comprising normal paraffins and oxygen-containing compounds, with a hydrorefining catalyst comprising a support containing USY zeolite and at least one solid acid selected from among silica-alumina, alumina-boria, silica-zirconia, silica-magnesia and silica-titania, and at least one metal selected from among metals of Group VIb and metals of Group VIII of the Periodic Table supported on the support.

The fuel stock according to the invention is not particularly restricted so long as it contains normal paraffins and oxygen-containing compounds, and as examples there may be mentioned petroleum-based or synthetic gasoline stocks, kerosene stocks, gas oil stocks and mixtures of two or more thereof. The content of normal paraffins in these fuel stocks will normally be 5% by mass or greater while the oxygen-containing compound content will normally be 0.1% by mass or greater, but the hydrorefining method of the invention is particularly suitable as a method for hydrorefining of normal paraffin-rich fuel stocks produced by FT synthesis.

The oxygen-containing compounds in the fuel stock will consist primarily of C2-9 alcohols in the case of gasoline stocks, C8-13 alcohols in the case of kerosene and C12-18 alcohols in the case of gas oil. Aldehydes and ketones may also be present in the fuel stocks in addition to the alcohols.

As mentioned above, the hydrorefining catalyst used for the hydrorefining method of the invention comprises a support containing USY zeolite and at least one selected from among silica-alumina, alumina-boria and silica-zirconia, and one or more metals selected from among Group VIb metals and Group VIII metals of the Periodic Table supported on the support. Here, "USY zeolite" (Ultra Stable Y-Zeolite) refers to Y-zeolite prepared by dealumination by acid treatment, steam treatment or the like.

The molar ratio of silica/alumina in the USY zeolite is not particularly restricted but is preferably 10-200, more preferably 15-100 and most preferably 20-60. If the silica/alumina molar ratio is less than 10 the fuel stock will be more prone to lightening, and if it is greater than 200 the catalytic activity will tend to be insufficient.

The mean particle diameter of the USY zeolite is preferably 1.0 μm or smaller and more preferably 0.5 μm or smaller. If the mean particle diameter of the USY zeolite is greater than 1.0 μm, the fuel stock will be more prone to lightening.

The proportion of USY zeolite in the support of the hydrorefining catalyst is not particularly restricted, but from the viewpoint of preventing lightening of the fuel stock, the proportion of USY zeolite is preferably 15% by mass or less and even more preferably 5% by mass or less based on the total amount of the support.

The solid acid component of the support of the hydrorefining catalyst may be one or more selected from among silica-alumina, alumina-boria, silica-zirconia, silica-magnesia and silica-titania. Preferred among these solid acids are silica-alumina, silica-zirconia and alumina-boria, with alumina-boria being particularly preferred for use.

The hydrorefining catalyst used for the invention may further contain a binder for molding of the support. There are no particular restrictions on the binder, and as preferred binders there may be mentioned alumina and silica. The form of the support is also not particularly restricted and may be in the form of particles, cylindricals form (pellets) or the like.

At least one metal selected from among Group VIb metals and Group VIII metals of the Periodic Table is supported on the support. As specific Group VIb metals there may be mentioned chromium, molybdenum, tungsten and the like. As specific Group VIII metals there may be mentioned cobalt, nickel, rhodium, palladium, iridium, platinum and the like. Of the metals mentioned above, it is preferred to use one or more selected from among nickel, palladium and platinum, and most preferably platinum or nickel and platinum in a nickel/platinum molar ratio of 1 or less are supported on the support. As an example of a method for supporting these metals on the support, there may be mentioned a method wherein the support is impregnated with an aqueous solution containing the metals and then dried and calcined. The loading amount of the metals in the hydrorefining catalyst is not particularly restricted, but it will usually be 0.01-2% by mass with respect to the support.

The hydrorefining apparatus used for the hydrorefining method of the invention is not particularly restricted so long as it allows contact between the fuel stock and hydrorefining catalyst in the presence of hydrogen, and for example, a conventional fixed bed reactor may be employed.

The reaction temperature for hydrorefining will normally be 160-350° C. and is preferably 200-300° C. If the reaction temperature exceeds 350° C. it will tend to be more difficult to achieve lightening of the fuel stock, while use of the fuel stock may be restricted as it may cause product discoloration. On the other hand, a reaction temperature of below 160° C. may not result in sufficient isomerization of the normal paraffins. The liquid space velocity (LHSV) will usually be 0.1-5.0 h$^{-1}$ and is preferably 0.5-3.0 h$^{-1}$. The reaction pressure is not particularly restricted, but the hydrogen partial pressure will usually be 0.5-10 MPa and is preferably 2.0-5.0 MPa. There are also no particular restrictions on the hydrogen/oil ratio, which will usually be 50-1000 NL/L and preferably 70-600 NL/L.

In the hydrorefining method of the invention, the hydrorefining catalyst is contacted with the fuel stock containing normal paraffins and oxygen-containing compounds in the presence of hydrogen to allow effective conversion of the oxygen-containing compounds such as alcohols in the fuel stock to paraffins, as well as effective conversion (isomerization) of the normal paraffins derived from the oxygen-containing compounds and the normal paraffins originally present in the fuel stock. More specifically, the oxygen-containing compounds such as alcohols in the fuel stock are converted to paraffins. Also, among the paraffins converted from the alcohols, the normal paraffins derived from normal alcohols, together with the normal paraffins originally present in the fuel stock, are converted to isoparaffins. In the hydrorefining method according to the invention as described above, it is possible to sufficiently prevent lightening of fuel stocks, and therefore maintain adequate fuel stock yields, while simultaneously accomplishing both isomerization of the normal paraffins in fuel stocks and reduction of oxygen-containing compounds in fuel stocks.

EXAMPLES

The present invention will now be explained in greater detail based on examples and comparative examples, with the understanding that these examples are in no way limitative on the invention.

[Catalyst Preparation]
(Catalyst 1)

USY zeolite with a mean particle diameter of 0.9 μm (silica/alumina molar ratio: 30), alumina-boria (alumina/boria molar ratio: 6.0) and an alumina binder were used for molding of a cylindrical support with ϕ=1.6 mm and a length of about 3 mm (USY zeolite/alumina-boria/alumina binder=3/57/40 (mass ratio)). The support was impregnated with an aqueous solution containing nickel/platinum in a molar ratio of 0.1 for loading of the metals to 1.0% by mass on the support. It was then dried at 120° C. for 3 hours and calcined at 500° C. for 1 hour to obtain Catalyst 1.

(Catalyst 2)

Catalyst 2 was prepared by molding a support, loading metals, drying and calcining in the same manner as for Catalyst 1, except that USY zeolite with a mean particle diameter of 0.4 μm (silica/alumina molar ratio: 30) was used instead of the USY zeolite with a mean particle diameter of 0.9 μm (silica/alumina molar ratio: 30) for Catalyst 1.

(Catalyst 3)

Catalyst 3 was prepared by molding a support, loading metals, drying and calcining in the same manner as for Catalyst 1, except that USY zeolite with a silica/alumina molar ratio of 150 (mean particle diameter: 0.9 μm) was used instead of the USY zeolite with a mean particle diameter of 0.9 μm (silica/alumina molar ratio: 30) for Catalyst 1.

(Catalyst 4)

Catalyst 4 (with a metal loading amount of 1.0% by mass with respect to the support) was obtained by molding a support, loading metals, drying and calcining in the same manner as for Catalyst 1, except that an aqueous solution of nickel/platinum in a molar ratio of 1.5 was used instead of the aqueous solution prepared with a nickel/platinum molar ratio of 0.1 for Catalyst 1.

(Catalyst 5)

A cylindrical support (alumina-boria/alumina binder molar ratio=60/40) was molded in the same manner as for Catalyst 1, except that only alumina-boria (alumina/boria molar ratio: 6.0) and an alumina binder were used, without USY zeolite. Catalyst 5 was obtained by loading the nickel/platinum onto the support, drying and calcining in the same manner as for Catalyst 1, except for using this support.

(Catalyst 6)

Catalyst 6 was obtained by support molding, metal loading, drying and calcining in the same manner as for Catalyst 1, except that active carbon was used as the support instead of the USY zeolite/alumina-boria/alumina binder support for Catalyst 1.

[Hydrorefining]

Example 1

Catalyst 1 (30 ml) was packed into a fixed bed circulating reactor, and a fuel stock fraction with a boiling point of 40-150° C. obtained by FT synthesis (normal paraffin/isoparaffin/olefin/oxygen-containing compound=62/8/25/5% by mass) was fed for hydrorefining at a reaction temperature of below 250 or 300° C. At all of the reaction temperatures, the hydrogen pressure was 3 MPa, the liquid space velocity of feedstock was 2.0 $h^{-1}$ and the hydrogen/oil ratio was 500 NL/L.

The reaction product was analyzed by gas chromatography to determine the conversion rate to light fraction components with a boiling point of below 40° C. (lightening rate), the conversion rate from normal paraffins to isoparaffins (isomerization rate) and the residual oxygen-containing compound content. The results are shown in Table 1.

Example 2

Hydrorefining and reaction product analysis were conducted in the same manner as Example 1, except that Catalyst 2 was used instead of Catalyst 1. The results are shown in Table 1.

Example 3

Hydrorefining and reaction product analysis were conducted in the same manner as Example 1, except that Catalyst 3 was used instead of Catalyst 1. The results are shown in Table 1.

Example 4

Hydrorefining and reaction product analysis were conducted in the same manner as Example 1, except that Catalyst 4 was used instead of Catalyst 1. The results are shown in Table 1.

Comparative Example 1

Hydrorefining and reaction product analysis were conducted in the same manner as Example 1, except that Catalyst 5 was used instead of Catalyst 1. The results are shown in Table 1.

Comparative Example 2

Hydrorefining and reaction product analysis were conducted in the same manner as Example 1, except that Catalyst 6 was used instead of Catalyst 1. The results are shown in Table 1.

TABLE 1

| | Reaction temperature 250° C. | | | Reaction temperature 300° C. | | |
| --- | --- | --- | --- | --- | --- | --- |
| | Lightening rate (% by mass) | Isomerization rate (% by mass) | Residual oxygen-containing compounds content (% by mass) | Lightening rate (% by mass) | Isomerization rate (% by mass) | Residual oxygen-containing compounds content (% by mass) |
| Example 1 | 0 | 25 | 0 | 1 | 32 | 0 |
| Example 2 | 0 | 35 | 0 | 2 | 40 | 0 |
| Example 3 | 0 | 14 | 0 | 0 | 21 | 0 |
| Example 4 | 3 | 21 | 0 | 6 | 27 | 0 |
| Comp. Ex. 1 | 2 | 2 | 1.3 | 8 | 4 | 0.1 |
| Comp. Ex. 2 | 4 | 1 | 1.6 | 11 | 2 | 0.4 |

Example 5

Hydrorefining was carried out in the same manner as Example 1, except that a fuel stock fraction with a boiling point of 150-360° C. obtained by FT synthesis (normal paraffin/isoparaffin/olefin/oxygen-containing compound=83/6/10/1% by mass) was used instead of the fuel stock fraction with a boiling point of 40-150° C. obtained by FT synthesis (normal paraffin/isoparaffin/olefin/oxygen-containing compound=62/8/25/5% by mass) in Example 1. The reaction product was analyzed by gas chromatography to determine the conversion rate to light fraction components with a boiling point of below 150° C. (lightening rate), the normal paraffin conversion rate (isomerization rate) and the rate of removal of oxygen-containing compounds (oxygen-containing compound removal rate). The results are shown in Table 2.

Example 6

Hydrorefining and reaction product analysis were conducted in the same manner as Example 5, except that Catalyst 2 was used instead of Catalyst 1. The results are shown in Table 2.

Example 7

Hydrorefining and reaction product analysis were conducted in the same manner as Example 5, except that Catalyst 3 was used instead of Catalyst 1. The results are shown in Table 2.

Example 8

Hydrorefining and reaction product analysis were conducted in the same manner as Example 5, except that Catalyst 4 was used instead of Catalyst 1. The results are shown in Table 2.

Comparative Example 3

Hydrorefining and reaction product analysis were conducted in the same manner as Example 5, except that Catalyst 5 was used instead of Catalyst 1. The results are shown in Table 2.

Comparative Example 4

Hydrorefining and reaction product analysis were conducted in the same manner as Example 5, except that Catalyst 6 was used instead of Catalyst 1. The results are shown in Table 2.

As clearly seen by the results in Table 1 and Table 2, lightening of the fuel stocks was sufficiently inhibited in Examples 1-8, while sufficient reduction of oxygen-containing compounds and a high normal paraffin isomerization rate were simultaneously achieved.

The invention claimed is:

1. A hydrorefining method, comprising:
contacting, in the presence of hydrogen,
a fuel stock produced by Fischer-Tropsch synthesis and comprising normal paraffins and oxygen-containing compounds, the fuel stock comprising gasoline stocks, and
a hydrorefining catalyst comprising a support containing USY zeolite and at least one solid acid selected from among silica-alumina, alumina-boria, silica-zirconia, silica-magnesia and silica-titania, and at least one metal selected from among metals of Group VIb and metals of Group VIII of the Periodic Table supported on the support; to convert oxygen-containing compounds to paraffins and to isomerized n-paraffins; wherein a molar ratio of silica/alumina in the USY zeolite is 10-200; wherein the proportion of the USY zeolite is 15% by mass or less based on the total amount of the support; and wherein the lightening rate of light fraction components with a boiling point of below 40° C. at a reaction temperature of 300° C. is no greater than 6% by mass.

2. A hydrorefining method according to claim 1, wherein a mean particle diameter of the USY zeolite is 1.0 μm or smaller.

3. A hydrorefining method according to claim 1, wherein the hydrorefining catalyst contains at least one metal selected from among nickel, palladium and platinum as the metals.

4. A hydrorefining method according to claim 1, wherein a reaction temperature for contact between the fuel stock and the hydrorefining catalyst is 160° C.-350° C., and the liquid space velocity is 0.1-5.0 $h^{-1}$.

TABLE 2

| | Reaction temperature 250° C. | | | Reaction temperature 300° C. | | |
|---|---|---|---|---|---|---|
| | Lightening rate (% by mass) | Isomerization rate (% by mass) | Residual oxygen-containing compounds content (% by mass) | Lightening rate (% by mass) | Isomerization rate (% by mass) | Residual oxygen-containing compounds content (% by mass) |
| Example 5 | 0 | 31 | 0 | 3 | 58 | 0 |
| Example 6 | 0 | 38 | 0 | 5 | 67 | 0 |
| Example 7 | 0 | 17 | 0 | 1 | 31 | 0 |
| Example 8 | 4 | 23 | 0 | 9 | 29 | 0 |
| Comp. Ex. 3 | 3 | 3 | 0.3 | 8 | 7 | 0 |
| Comp. Ex. 4 | 7 | 3 | 0.2 | 18 | 4 | 0 |

5. A hydrorefining method according to claim 1, wherein the hydrorefining catalyst contains nickel and platinum as the metals.

* * * * *